United States Patent Office 3,026,891
Patented Mar. 27, 1962

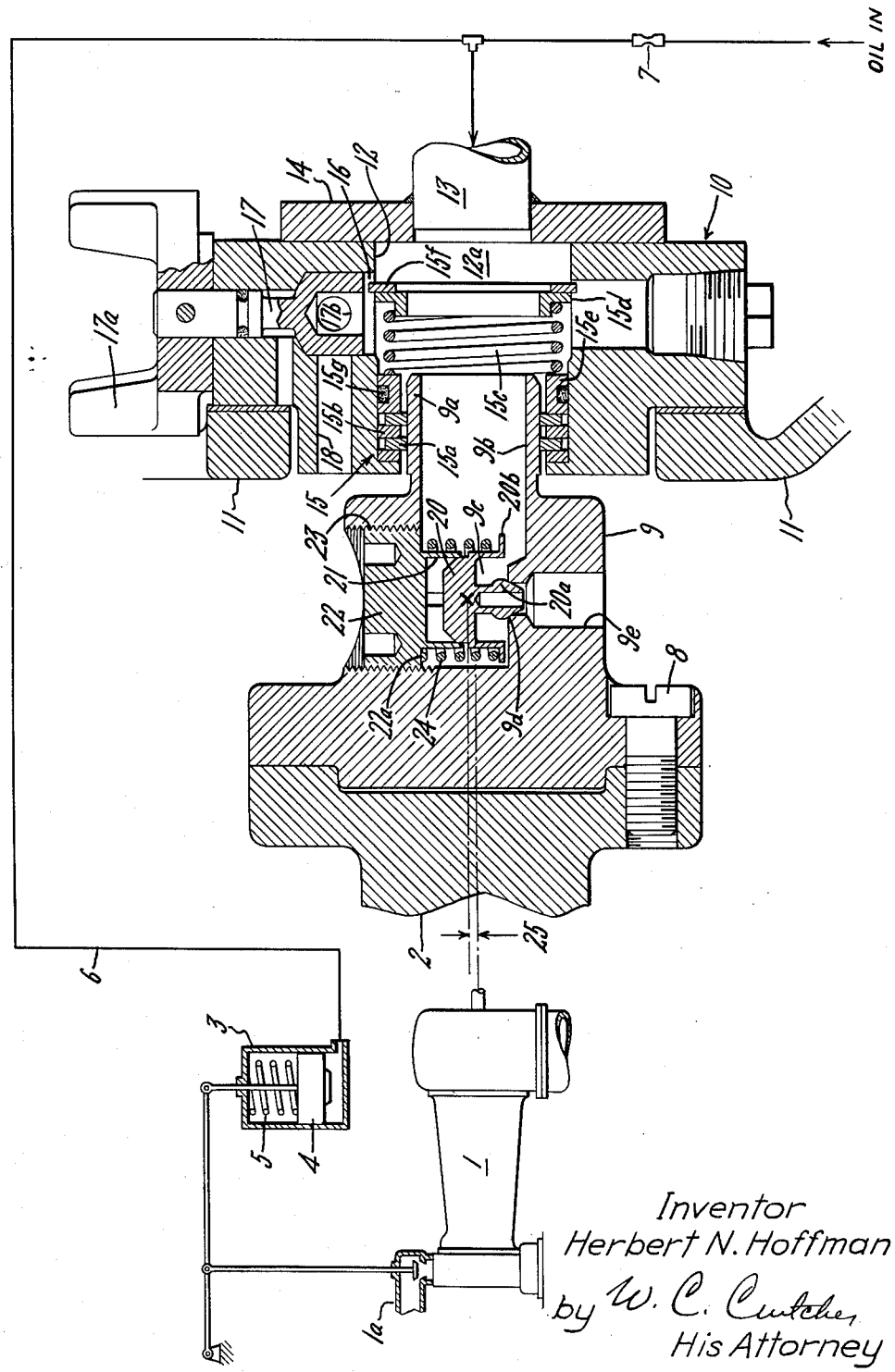
Inventor
Herbert N. Hoffman
by W. C. Crutcher,
His Attorney

3,026,891
SHOCK RESISTANT SPEED RESPONSIVE
TRIP DEVICE
Herbert N. Hoffman, Lunenburg, Mass., assignor to General Electric Company, a corporation of New York
Filed Dec. 31, 1959, Ser. No. 863,166
3 Claims. (Cl. 137—56)

This invention relates to a hydraulic centrifugally actuated speed limiting mechanism and more particularly it relates to an overspeed trip mechanism which is resistant to tripping inadvertently through vibration or external shock.

One type of overspeed trip which has been frequently used in the past, in prime movers such as steam turbines, utilizes a movable member disposed on a rotating member turning at a speed proportional to the shaft speed and actuated by centrifugal force. The movable member is mounted so that its center of gravity is eccentric to the shaft centerline and it is usually biased toward the shaft centerline with a spring which holds it in a retracted position until a predetermined speed is exceeded, whereupon it extends from the rotating member and strikes a trip lever. The trip lever is arranged to actuate a pilot valve or to operate some other emergency operating device, such as an electrical switch, when it is struck, which shuts off or restricts the flow of motive fluid to the powerplant. This arrangement of overspeed mechanism is commonly known as the "off-center bolt" type and is well known to those skilled in the art, one such being disclosed in the United States Patent No. 2,388,282 issued to H. M. Otto on November 6, 1945 and assigned to the assignee of the present invention.

One serious shortcoming of the "off-center bolt mechanism" is that the trip lever and associated pilot valve are disposed on some stationary structure, which means that they are subjected to any external shock or vibration which may be communicated to the supporting structure. In some applications, such as in shipboard use, where the supporting structure is subject to sudden movements, or in applications where the turbine casing and foundation are operating in an unusual vibrational or percussive environment, a sudden movement communicated to the trip lever or pilot valve may cause the parts to move relative to the casing, due to their inertia, and inadvertently trip the mechanism, causing an unwanted shutting down of the powerplant. In order for the overspeed mechanism to function accurately, the various levers and linkages must move freely so that actuation by the off-center mechanism will come at the precise expected time. Yet if the linkage is delicately balanced to provide this accuracy, it is even more subject to inadvertent tripping from shock or vibration.

It has been suggested to introduce a fluid into the hollow interior of an off-center bolt type overspeed mechanism for the purpose of providing an "artificial overspeed condition," for the purpose of testing the trip valve mechanism. Such an arrangement, however, still employs external levers, linkages, and pilot valves and hence is still subject to external shock.

Accordingly, one object of the present invention is to provide an improved shock-resistant speed limiting mechanism.

Another object of the invention is to provide a rotating overspeed trip device which minimizes inertial effects thereon.

Another object is to provide a centrifugally actuated off-center overspeed mechanism which requires no stationary mechanical linkage members or valves which are subject to shock or vibration effects.

Still another object is to provide a hydraulic centrifugally actuated overspeed mechanism with an internal valve having improved means to prevent malfunction of the valve due to dirt or foreign objects in the hydraulic fluid.

The subject matter of the invention is particularly pointed out and distinctly claimed in the concluding portion of the specification. The invention, however, both as to organization and method of practice, together with further objects and advantages thereof, may best be understood by reference to the following description taken in connection with the accompanying drawing in which the single FIGURE of the drawing is a horizontal elevation, in section, of my improved shock-resistant overspeed trip mechanism including a schematic representation of portions of a typical powerplant with which the mechanism is designed to operate.

Generally stated, the invention is practiced by providing a rotating member having an enclosure filled with hydraulic fluid under pressure, the hydraulic pressure of the fluid also being used to control a main motive fluid valve in the powerplant. The rotating member defines a radially oriented valve seat with an off-center valve disk biased against the seat to prevent the escape of fluid. A predetermined speed overcomes the bias and lifts the valve disks from the seat to discharge the hydraulic fluid and shut down the powerplant.

Referring now to the drawing, a turbine 1 receives motive fluid through an inlet valve 1a and includes a rotating shaft terminating in the flanged end portion 2. Inlet valve 1a is maintained in an open position by a hydraulic cylinder 3 containing a piston 4 biased in the inlet valve closing direction by spring 5. A hydraulic fluid conduit 6 entering cylinder 3 below piston 4 carries fluid supplied by a source of hydraulic fluid under pressure (not shown) via orifice 7. This is a conventional arrangement and loss of fluid pressure in conduit 6 will cause spring 5 to force piston 4 downward and close stop valve 1a.

Attached to the flanged turbine end portion 2 by bolts 8 so as to rotate therewith is a hollow trip mechanism body 9. Body 9 includes an extending cylindrical portion 9a enclosed by a hydraulic fluid supply housing shown generally as 10. Supply housing 10 is stationary and is mounted coaxially with extending portion 9a of the body 9 by means of stationary bracket members, fragments of which are shown at 11. Supply housing 10 defines a central bore 12 passing therethrough defining a chamber 12a which is supplied by a conduit 13 sealed into a cover plate 14. Conduit 13 communicates with conduit 6, hence loss of pressure in chamber 12a will cause the stop valve 1a to close, shutting down the turbine. At the opposite end of bore 12, a fluid seal, shown generally as 15, prevents leakage of hydraulic fluid from between the housing bore 12 and the extending portion 9a of body 9.

Seal 15 consists of inner and outer sealing rings 15a, 15b, respectively transversely compressed by a spring 15c, which is held in place between spring retaining rings 15d, 15e. A snap ring 15f furnishes a positive stop to keep spring 15c compressed and an O-ring 15g held by retaining ring 15e further prevents leakage.

Opening into chamber 12a of supply housing 10 is a cylindrical bore 16 housing a rotatable plug valve 17. A handle 17a permits the valve 17 to be rotated in bore 16 so that a port 17b defined by the valve body can register with a discharge conduit 18 defined by the supply housing body. Plug valve 17 is for testing or handtripping of the overspeed mechanism; and it will be apparent that when port 17b registers with vent conduit 18, hydraulic fluid will flow outward from supply housing 10 faster than it can flow in through orifice 7 to supply hydraulic cylinder 3, and the turbine stop valve 1a will therefore close.

The primary means for discharging hydraulic fluid pressure from chamber 12a, to shut down the powerplant upon overspeed, is the rotating overspeed body 9 and its associated parts. The extending cylindrical portion 9a defines a central bore 9b through which fluid is supplied to a central enclosure 9c in body 9. Communicating with the enclosure 9c inside body 9 is a radially facing valve seat 9d through which hydraulic fluid can escape by means of a discharge conduit 9e. It is to be particularly noted that the valve seat 9d lies at a lesser radius in body 9 than the radius of the bore 9b. This is for a particular reason in preventing accumulation of foreign particles, as will be explained hereinafter.

Cooperating with valve seat 9d is a radially movable plunger 20 which includes an enlarged disk portion 20a forming a closure for valve seat 9d. Plunger 20 slides within radially extending walls 21 of a closure plug 22 secured in body 9 by means of threads 23. A compression spring 24 held in place between walls 22a and flange 20b of the closure plug 22 and the plunger 20 respectively serves to bias plunger 20 against valve seat 9d.

It is of particular importance to note that when plunger 20 is in its fully closed position with the valve disk 20a blocking flow through valve seat 9d, the center of gravity of plunger 20 is eccentric from the axis of the turbine shaft and on the opposite side thereof from the valve seat 9d. The center of gravity here is indicated by an "X" and is separated from the shaft centerline by an "eccentricity gap" 25. It will be apparent that the bias furnished by compression spring 24 can be adjusted by screwing the closure plug 22 upward or downward, without varying the amount of eccentricity 25. Compression spring 24 is selected carefully to have a known spring constant so that the speed at which the turbine trips can be accurately and consistently predetermined.

The operation of my improved shock resistant overspeed mechanism will now be described. It will be apparent that venting of hydraulic fluid from conduit 13 through either the hand-rotatable plug valve 17 or through the opening of valve seat 9d will cause the turbine to shut down by the spring 5 closing the stop valve 1a as explained previously. The manual trip valve 17, being of the rotating plug type, is not susceptible to being accidentally tripped through shock or vibration. It requires a positive rotating movement to align ports 17b, 18, and hence the likelihood of valve 17 opening through shock is extremely remote, barring direct accidental contact with hand-knob 17a.

Of more importance is the constantly varying disposition of the rotating valve formed by disk 20a and valve seat 9d inside body 9. Since the center of gravity of plunger 20 is separated from the rotational axis of the turbine shaft by the eccentricity shown at 25, centrifugal force acting on the rotating plunger will cause the center of gravity "X" to tend to move away from the shaft axis, against the bias of compression spring 24. However, the bias of spring 24 has been previously adjusted by properly positioning the closure plug 22, and plunger 20 will not begin to move away from the axis until this preset bias is exceeded. The speed at which plunger 20 begins to move is a predetermined overspeed condition, which may be, for example, 10% in excess of rated speed. When this speed is reached, disk 20a will begin to bleed hydraulic fluid from supply housing chamber 12a through the valve seat opening 9d and discharge conduit 9e to a sump (not shown). The resulting reduction of the fluid pressure in cylinder 3 will thus cause the stop valve 1a to start to close, reducing the speed of the turbine.

The reason that the rotating valve disk 20a is not subject to shock or vibration effects, as would be a stationary valve, is that its orientation in space is constantly changing. It will be understood that any shock or vibration impulse communicated to the turbine casing must necessarily be of a given duration and direction. In a conventional off-center bolt type trip mechanism, momentary movement or acceleration of the stationary part of the powerplant will tend to "leave behind," by reason of their inertia, any parts which are movable with respect to the structure to which the impulse is applied. This could result in "tripping" of a latch or movement of a lever inadvertently if the direction of the applied shock should be accidentally oriented in the proper direction.

With my device, however, the turbine shaft is turning very rapidly, perhaps on the order of 10,000 r.p.m., so that the orientation in space of plunger 20 is constantly changing in a plane normal to the shaft axis, which is also the plane in which the plunger 20 is designed to move. Therefore, during the period of the shock impulse, the space orientation of plunger 20 may possibly reverse several times, and the effect on the plunger of the movement of the casing due to the shock is thus nullified.

An important feature of the invention is the location of valve seat 9d with respect to the bore 9b through which the hydraulic fluid is supplied to the rotating valve. As explained previously, valve seat 9d is located at a smaller radius than that of the bore 9b. The deposition of sludge or foreign particles between valve disk 20a and valve seat 9d will readily be recognized as a serious occurrence, since this may cause sticking or block valve 20a open and prevent the turbine from resuming operation when the overspeed condition is corrected. Bore 9b acts as a centrifuging chamber to collect the heavier and more dense foreign particles and sludge in the hydraulic fluid toward the walls of bore 9b, thus allowing only the less dense and clean oil to flow through valve seat 9d when the valve is tripped.

The improvement afforded by my improved overspeed device should now be apparent. By utilizing an off-center valve plug cooperating with a valve seat in a rotating member, the orientation of the valve is constantly changed so that shock impulses communicated to the casing and the shaft are nullified. Moreover, the only valve secured to the stationary supporting structure is of the rotating plug type which is also not subject to shock. Therefore, my overspeed mechanism does not involve the use of extraneous linkages, pilot valves, levers, etc., which are subject to inadvertent actuation.

Although the device shown is designed to operate with the hydraulic line under pressure and tripping by venting the pressure, it is conceivable to utilize a system wherein increasing the hydraulic fluid pressure will shut down the turbine. Knowing the principle of operation of my mechanism, therefore, it would only be necessary to locate the valve seat on the same side of the plunger as the center of gravity of the plunger so that centrifugal force would tend to close the plunger against the action of a biasing spring, rather than to open it.

While there has been described what is at present considered to be the preferred embodiment of the invention, it will be understood that various modifications may be made therein, and it is intended to cover in the appended claims all such modifications as fall within the true spirit and scope of the invention.

What I claim as new and desire to secure by Letters Patent of the United States is:

1. Centrifugally operated valve means comprising a first rotatable member defining a central chamber and a radially disposed discharge conduit communicating through the wall of the member with the central chamber thereof, the wall of the member having a valve seat portion disposed between the discharge conduit and the interior chamber at a radius from the first member axis which is less than that of the radially outermost interior wall surfaces of the chamber, plunger means disposed in said central chamber with its axis in a radial plane relative to the axis of rotation and including a valve disk portion cooperating with said valve seat portion, said plunger means having its center of gravity normally located eccentrically with respect to the axis of rotation of the first member, biasing means disposed to exert a force on the plunger means opposite that produced by centrifugal force on the plunger means due to the eccentrically located center of gravity, said biasing means being so selected and adjusted as to yield to centrifugal force and effect movement of the plunger means away from the valve seat portion at a preselected speed condition, means for supplying hydraulic fluid under pressure to fill the central chamber of the first member, whereby the plunger means will move away from said valve seat portion when a preselected overspeed condition is reached to effect reduction of the pressure of the hydraulic fluid supplied thereto while foreign particles in the hydraulic fluid will be centrifuged to a radius greater than that of the valve seat portion so as not to interfere with reclosing of the plunger means.

2. Centrifugally operated valve means comprising a first rotatable hollow member defining a discharge conduit communicating with the interior thereof and a radially facing valve seat providing communication between the discharge conduit and the hollow interior, said valve seat being radially spaced from the interior walls of said first hollow member toward the axis of rotation, radially slidable plunger means disposed in the interior of said first member including a valve disk portion cooperating with said valve seat, said plunger means having its center of gravity located eccentrically with respect to the axis of rotation of the first member and on the side thereof opposite said valve seat, biasing means disposed between the plunger means and the first member exerting a force on the plunger means so as to urge the valve disk portion toward the valve seat, said biasing means being selected to yield to centrifugal force and allow movement of the valve disk portion from the valve seat at a preselected turbine overspeed condition, supply chamber means including rotating sealing means cooperating with the rotating first member and supplying hydraulic fluid to the interior of the first member, and a source of hydraulic fluid under pressure sealingly connected to said supply chamber means whereby the valve disk will move from the valve seat when said turbine overspeed condition is reached to allow the discharge of pressurized hydraulic fluid from said supply chamber while foreign particles in the hydraulic fluid will be centrifuged to a radius greater than that of the valve seat portion so as not to interfere with reclosing of the plunger means.

3. Centrifugally operated valve means comprising a first rotatable hollow body including an extending cylindrical portion defining a conduit connecting with the interior of said body, the body also defining a radially facing valve seat opening disposed at a radius from the rotational axis of said body which is less than that of the radially outermost interior wall surfaces of said body, radially slidable plunger means disposed in the interior of the body and including a valve disk portion cooperating with said valve seat, said plunger means having its center of gravity located eccentrically with respect to the axis of rotation of the body and on the opposite side thereof from said valve seat, biasing means disposed between the plunger means and the body exerting a force on the plunger means urging the valve disk portion thereof against the valve seat, said biasing means being selected to yield to centrifugal force and allow movement of the plunger means at a preselected speed, condition, supply chamber means defining a central bore coaxially located with respect to the extending hollow cylindrical portion of the body, sealing means disposed between the hollow cylindrical portion and said bore to allow hydraulic fluid to be supplied to the interior of the body and a source of fluid under pressure sealingly connected to said supply chamber means whereby the plunger means will move from the valve seat when said speed is reached to allow the discharge of pressurized hydraulic fluid from the supply chamber through said valve seat.

References Cited in the file of this patent
UNITED STATES PATENTS

| 1,811,850 | Huff | June 30, 1931 |
| 2,866,470 | Hold | Dec. 30, 1958 |
| 2,876,784 | Adams | Mar. 10, 1959 |
| 2,922,429 | Whitaker | Jan. 26, 1960 |

FOREIGN PATENTS

| 228,499 | Great Britain | Jan. 27, 1926 |
| 963,228 | France | Dec. 26, 1949 |